United States Patent [19]

Blake

[11] Patent Number: 4,669,170

[45] Date of Patent: Jun. 2, 1987

[54] METHOD OF MAKING A CLAMPING DEVICE

[76] Inventor: John B. Blake, 103 Oak Ave., Park Ridge, N.J. 07656

[21] Appl. No.: 881,956

[22] Filed: Jul. 3, 1986

Related U.S. Application Data

[62] Division of Ser. No. 783,655, Oct. 3, 1985, Pat. No. 4,619,447.

[51] Int. Cl.[4] .............................................. B23P 11/00

[52] U.S. Cl. ........................................ 29/434; 29/257; 29/270; 29/283

[58] Field of Search ................. 29/283, 256, 257, 428, 29/434, 270; 24/514; 269/221, 222, 223, 239, 258

[56] References Cited

U.S. PATENT DOCUMENTS

| | | | |
|---|---|---|---|
| 457,997 | 8/1891 | Lorey | 269/223 X |
| 1,623,045 | 4/1927 | Butt | 269/221 |
| 2,901,012 | 8/1959 | Crispin | 269/221 X |
| 3,736,629 | 6/1973 | Blake | 269/221 X |
| 3,742,587 | 7/1973 | Sklar | 29/434 |
| 4,099,315 | 7/1978 | Pudenz | 29/434 |

*Primary Examiner*—Howard N. Goldberg
*Assistant Examiner*—Ronald S. Wallace
*Attorney, Agent, or Firm*—Ralph R. Roberts

[57] ABSTRACT

This invention is an improved concept of the clamp shown in U.S. Pat. No. 3,736,629, as issued June 5, 1973. This construction of a clampingdevice includes forming two C-shaped arms, each of which is an assembly of two plate-like members of sheet metal. These two arm assemblies are pivotally retained at one end with the plate-like members in an overlay condition. A pivot pin has an enlarged center portion which acts as a spacer and has two eccentric cam areas sized and spaced to actuate apertures formed in one of the arm pairs. Shouldered rivets retain these arm assemblies in spaced array and a stop pin secured in this pivot pin has a length sufficient to engage a secured rivet. At one limit of movement of the stop pin, the cam areas move one arm assembly to a maximum clamping force and, at the other limit of movement of the stop pin, the cam areas are in a reduced-force application. Trunnion blocks are pivotally retained in each arm, with one block having through threads and the other block having a smooth bore adapted to rotatably retain a socket-headed cap screw whose threaded portion is compatibly disposed in the threaded trunnion. Rotation of this screw causes jaw ends having pivoted clamp pads to be brought to and away from each other. The members of this clamp are of metal and the pivot pin and clamp pads may be made by a screw machine and then heat-treated.

7 Claims, 11 Drawing Figures

METHOD OF MAKING A CLAMPING DEVICE

CROSS-REFERENCE TO RELATED PATENTS

This is a divisional application drawn to the method of making a clamping device, as shown in granted U.S. patent application Ser. No. 783,655, filed Oct. 3, 1985 now U.S. Pat. No. 4,619,447 issued Oct. 28, 1986. Also, to the extent applicable, reference is made to my U.S. Pat. No. 3,736,629, as issued June 5, 1983. This improved clamping device is much like the device shown in this patent, but changes in concept of construction and actuation have made the improved clamp of this invention simple, rugged, and inexpensive to produce in place of clamp of U.S. Pat. No. 3,736,629 that is complex, fragile, and too expensive to produce.

BACKGROUND OF THE INVENTION

1. Field of the Invention

With respect to the field of the invention as establishd in and by the United States Patent Office, this invention is believed to be found in the general class entitled "Joints and Connections" and in adjustable clamping devices therein.

2. Discussion of the Prior Art

The tool which is the subject of this application is known as a hand clamp. The name probably derives from the fact that it is applied by hand rather than by any power-enhancing means such as air or hydraulic pressure, but it is also true that in most cases a clamp serves as a surrogate human hand, to apply and maintain pressure where and as required. Hand clamps take many forms, some highly specialized; viz. clamps for holding picture frames square for nailing, or for holding two pipe ends in alignment for welding, and as such having little or no other useful purpose. The variety of such special clamps is probably in the several hundreds, many of which have been the subject of patents.

It is a truism that there is, or can be, no perfect all-purpose clamp. Possible uses are much too varied, and most uses do not require great strength, but rather generous throat depth— and low cost. Thus, in less demanding applications than metalworking, there is a considerable variety of types, each with some actual or perceived advantage over all others.

In metalworking, strength necessary to hold workpieces which are subjected to heavy metal-removal operations is of primary importance. Given this requirement, the number of types currently available is sharply reduced—to three, at most. They are the parallel clamp, the C-clamp, and a proprietary tool known as the Kant-Twist clamp, which was granted U.S. Pat. No. 2,726,694 in the middle 1950's.

Historically, the parallel clamp is the oldest-known form of clamp, being at least 800 years old in wooden form—and still much used in that form by woodworkers. The wooden version is referred to as a hand screw. The version used in metalworking—the parallel clamp—is generally constructed of hardened steel, both the jaws and the spindles.

The C-clamp, in a wooden version, is known to be at least 600 years old. While the evolution of the C-clamp is obscure, most readily available C-clamps today are cast of malleable iron and are not particularly strong. In the metalworking industry the most generally used type of C-clamp is made of forged and heat-treated steel, and is the most durable of all clamps.

The Kant-Twist clamp was designed in recognition of the need for something more versatile than the parallel and C-clamps. After a slow start, it became quite popular. And, after its patent expired circa 1973, copies began to reach these shores from Japan, Taiwan, Korea and, finally, mainland China, so that the American originators have come on hard times.

The parallel clamp is mostly used by tool-and-die makers, instrument makers and other high-precision craftsmen. It serves well only when clamping flat, parallel surfaces, and is only used for that purpose. Carefully used, it will not mar highly-finished surfaces, and it cannot cause workpieces to twist, as can the C-clamp. But its application is time-consuming and requires some degree of skill, since two spindles must be adjusted simultaneously. And the parallel clamp is difficult to use where working space is limited. When it is properly adjusted, its strength is roughly 80% of that of the C-clamp, size for size.

The C-clamp is the most widely used of the three types. It can bring-to-bear the greatest pressure of the three; it is, as has been said, very durable, and it is usually easy to apply. But, in many applications, it has definite faults. The length of the frame plus the length of the spindle, fully extended, is 3½ to 4 times its clamping capacity. This, in addition to the fact that the T-handle on the end of the spindle must be turned to tighten the clamp, makes it impossible to use in many space-limited situations. Another undesirable feature of the C-clamp is the fact that the spindle is tightened directly against a workpiece, the workpiece being protected by a steel pad attached loosely to the end of the spindle. On a correctly functioning clamp, the pad should remain stationary while the spindle revolves. But this is often not the case: the pad turns with the spindle, causing the clamp to "walk" across a rough surface such as cast iron, or, in the case of smooth workpieces, causing the workpiece under the spindle to twist out of the desired position.

After many centuries of inconvenience, a solution to some of the problems of the praralel and C-clamps was devised—the Kant-Twist clamp. It is more compact and easier to apply than either of the others and, as the name implies, does not twist workpieces or "walk" across rough surfaces. But in strength it is a failure. At best, it can produce about b 40% of the pressure of an industrial C-clamp, and some specific designs of the Kant-Twist clamp produce considerably less than 40% of comparable C-clamps. Thus, in the metalworking industry, it must be looked upon as a light-duty clamp. The metalworking industry still needs a better clamp.

Because the industry needs a better clamp, the clamping device of my U.S. Pat. No. 3,736,629 (identified above) was received with great interest by many of the country's most reputable manufacturers. But interest foundered, in every case, on the reef of cost. Several features which were desirable but not necessary could have been simplified, but the heart of the tool—the eccentric cam and its function-limiting means—were too expensive to produce. No inexpensive design could be devised so, after several years of trying, the tool was abandoned. The metalworking industry stil needs a better clamp.

SUMMARY OF THE INVENTION

Because of my conviction that the basic design of the clamping device of my U.S. Pat. No. 3,736,629 was the best possible design from the standpoint of strength, compactness, and ease of application—a conviction reached after several quite different designs were tried and abandoned—I returned to it. And, with the fresh perspective gained by six or seven years away from the problem, the solution presented itself with startling rapidity. In fact, not only did the solution present itself, but a considerable improvement in the basic force-applying geometry was revealed.

In simple terms, the fundamental differences between the device of my U.S. Pat. No. 3,736,628 and that of this disclosure, aside from the obvious component design changes dictated by a need to reduce production costs at some minor loss of utility, are two: In place of the washer-like component of the original clamping device which, in conjunction with a small pin projecting from the side of the cam, limited the cam's rotation (a system which was expensive to produce and presented the possibility of pin-shearing in use), the improved design provides a sturdy cross-pin in the cam member, rotation of which is limited by the adjacent spacerrivets joining the jawplates. The second area of improvement is in the direction in which camming force is applied: In the original design, the camming action spread the opposing jaws on a line parallel to the adjusting screw. In the improved design, the jaw opposite the screw head is merely a brace, force being applied to the jaw under the screw head perpendicularly to an imaginary line drawn between the pivot center of the trunnion block under the screw head and the pivot center of the cam member. This change in direction of force provides a leverage improvement of over 39%.

Thus, this invention may be summarized, at least in part, with reference to its objects. It is an object of this invention to provide, and it does provide, an improved clamping device in which a pair of C-clamped arm members is pivotally retained at one end in an overlaid arrangement and with their other ends with pivotally-retained pressure pads. Intermediate the ends of these arem members there is disposed an adjusting screw that is adjusted to not only provide the desired distance, but also to provide the primary force-applying means and force-retaining means. The pivot pin at the one end of the arms has cam surfaces to provide a selective pressure adjustment of the gripping pads at the other end of the arm.

A further object of this invention is to provide, and it does provide, a clamping mechanism in which two pivoted C-shaped arms are pivotally retained in an overlaid condition and position at one end, with this pivot having cam means. The other ends of the arms are provided with pivotally-retained, inwardly-directed clamping pads adapted to retain the workpiece, Near the midlength of each arm is positioned a rotatable screw with pivotal retaining means, said screw having a threaded portion that is carried in a threaded, pivoted-retaining means on one arm so as to move the arms toward or away from each other to bring the pads into retaining condition and apply primary pressure. The pivot cam at the overlaid ends is turned to provide maximum clamp force. This clamp thus provides a rugged device that is easily manipulated to exert the desired action. This clamp is easily assembled from stamped steel arms, rivets and hardened screw machine members.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of a clamping device as adopted for use in holding workpieces and showing a preferred means for constructing said clamping device. This specific embodiment has been chosen for the purpose of illustration and description as shown in the accompanying drawings wherein:

BRIEF DESCRIPTION OF THE DRAWINGS

In the following description and in the claims, various details are identified by specific names for convenience. These names are intended to be generic in their application. Corresponding reference characters refer to like members throughout the several figures of the drawings.

Figure 1:
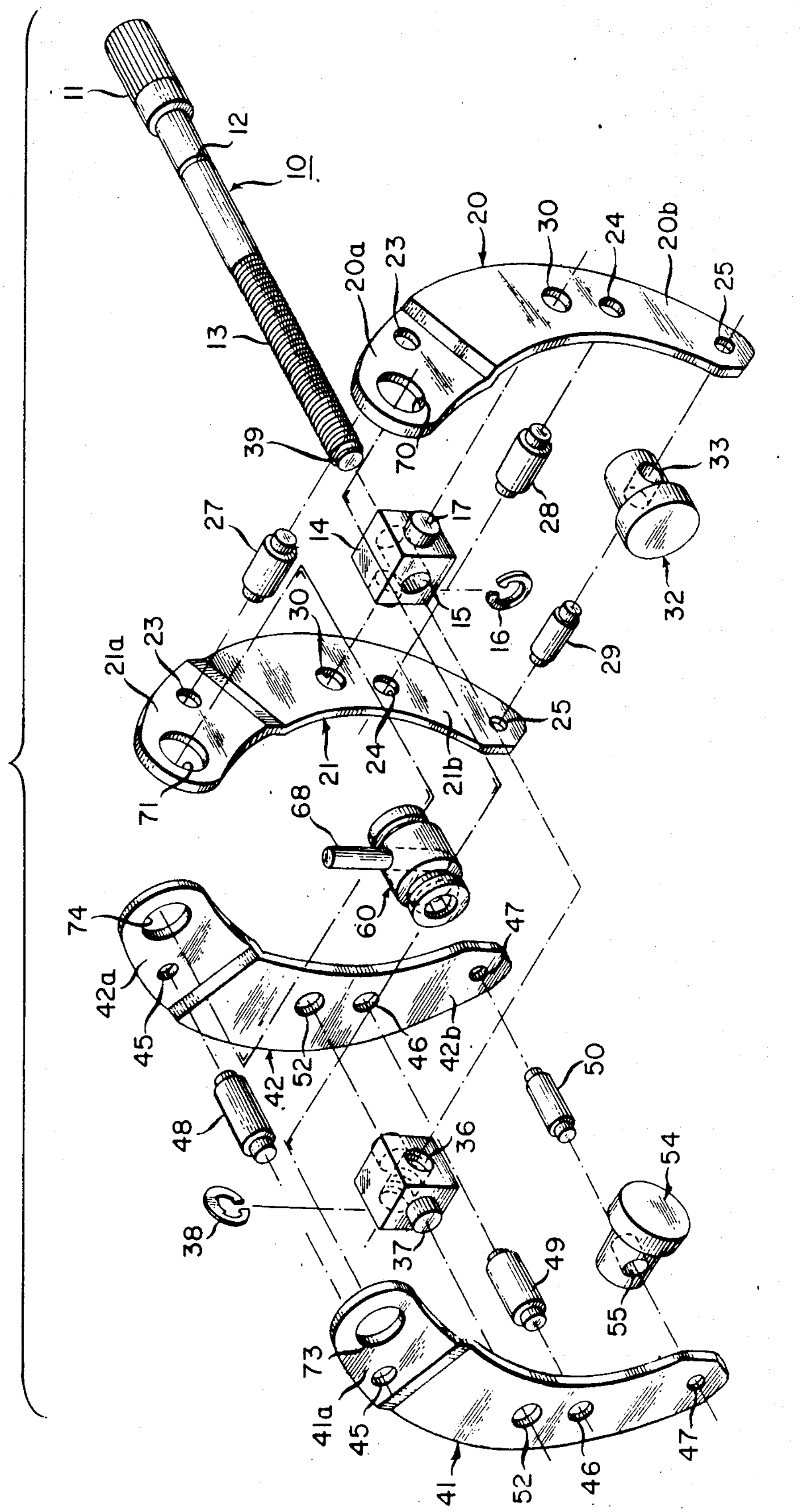
FIG. 1 represents an exploded isometric view, partly diagrammatic, and showing relative placement or positioning of the components as used in the clamping device of this invention.

The drawings accompanying, and forming part of, this specification disclose details of construction for the purpose of explanation, but structural details may be modified without departure from the concept and principles of the invention and the invention may be incorporated in other structural forms than shown.

DESCRIPTION OF THE CLAMPING DEVICE OF FIGS. 1 THROUGH 7

Referring now to the drawings as briefly described above, the several components are shown in FIG. 1. In this view, it is to be noted that a socket-headed cap screw, generally identified as 10, is shown as extended from the right, whereas in FIGS. 2 and 3 the knurled head of this screw is depicted on the left. This showing position is intended to particularly emphasize that the clamping device of this invention may be used with the head of the screw of the clamping device in either attitude. The head end of this screw conventionally has therein a hex socket 11, although other configurations may be provided. To the left of this head and in and on the shank portions thereof is formed a shallow groove 12 spaced a given distance from the head. A thread 13 is conventionally formed on this cap screw. A trunnion block, generally identified as 14, has a hole 15 therethrough. This hole is a sliding fit on the shank of the screw 10. The thickness or width (right to left) of the trunnion block 14 is just a few thousandths of an inch less than the distance from the shoulder of the head of screw 10 to the shallow groove 12. A retaining ring or washer 16 is adapted to be mounted in this groove 12 to retain this trunnion block 14 on the shank of the screw 10. Trunnion block 14 as shown has two pivot pins 17 which provide movement and also retention of this block.

As depicted in FIG. 1, the right C-shape arm movement includes stamped and formed sheet-metal members, generally identified as 20 and 21, each of which is provided with inwardly-directed offset portions 20*a* and 21*a*. Extending downwardly from these offset portions are the major portions of these arms. These portions are identified as 20*b* and 21*b*. It is to be noted that in each arm component there are formed rivet holes 23, 24 and 25. These holes may or may not be of a like size, but are sized to be a snug fit for the reduced ends of the rivets used to provide the assembly. Spacer-rivets 27, 28 and 29 are depicted. Each arm portion 20*b* and 21*b* also has holes 30 which are sized to rotatably retain the pivot pins 17 formed on the trunnion block 14. Also shown and pivotally carried by rivet 29 is clamp pad 32 which has a hole 33 through which this rivet passes. It is to be noted that the lower ends of the arms 20 and 21 are contoured so that the movement of clamp pad 32 may be limited, thereby assuming proper orientation of the pad face with the workpiece.

A threaded trunnion block 35 has threads 36 that are compatible with threads 13 on cap screw 10. Pivot pin portions 37 are also provided as in block 14. Another retaining ring or washer 38 is adapted to be secured in a groove 39 formed in and at the terminal end of the screw 10.

The left arm also, as an assembly, employs two C-shaped sheetsteel members. These members are generallly identified as 41 and 42. The upper ends have outwardly-directed offset portions 41*a* and 42*a*. Extending downwardly from these offset portions are the major portions 41*b* and 42*b* of the C-shaped arms. As in the right arm assembly, there are formed in each member three rivet holes, respectively identified as 45, 46 and 47. Rivets 48, 49 and 50 are used to secure these plates in spaced array. The spacing is provided by the larger central portion of all rivets. Trunnion block 35 is movable between these secured plates 41 and 42 and rotates about pivot pin portions 37 which are rotatably mounted in like holes 52 formed in plates 41 and 42. On the lower end of this arm assembly is clamp pad 54 having a through hole 55 providing a pivoting action about rivet 50. The lower ends of members 41 and 42 are contoured as in 20 and 21 to provide a limited movement of the clamp pad 54.

Figure 4:
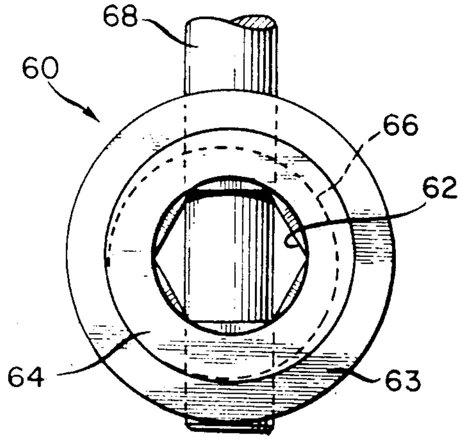
FIG. 4 represents a diagrammatic plan view in a greatly enlarged scale and showing the eccentric cam portions as formed on this pivot pin member, this view absent the arm portions and taken on the line 4—4 of FIG. 5 and looking in the direction of the arrows.
Figure 5:
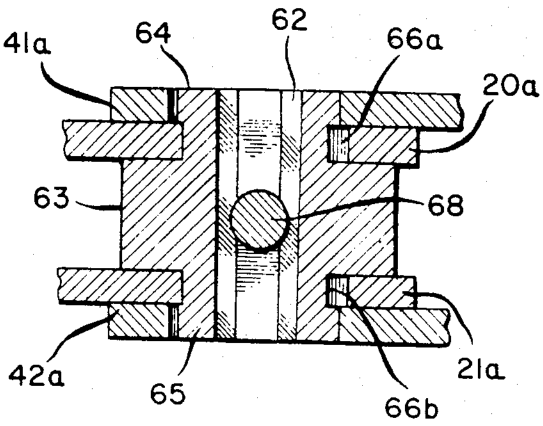
FIG. 5 represents a diagrammatic and sectional side view in the enlarged scale of FIG. 4 and showing the eccentric portions formed on the pivot pin, this view taken on the line 5—5 of FIG. 2 and looking in the direction of the arrows.

A pivot cam, generally identified as 60, is better described in conjunction with the showing in FIGS. 4 and 5. This is contemplated to be a screw machine part with a hex aperture 62 therethrough which is best seen in FIG. 4. As depicted in FIGS. 4 and 5, this pivot cam has a central larger body portion 63 and reduced end portions 64 and 65. In these reduced portions are formed like eccentric cam areas 66*a* and and 66*b*. These cam areas are particularly formed and have a width to actuate the arm portions 20 and 21. A stop pin 68 is mounted and secured in a transverse hole in the pivot cam 60 to provide means, in conjunction with the body portions of rivets 27 and 48, to limit the movement of pivot cam 60. The forming of this pivot cam and the eccentric cam portions 66 and the transverse hole for stop pin 68 is calculated precisely, and in FIGS. 8A, B, C and D the relationship of the several formed portions of this pivot cam is shown and discussed.

The arm members are provided with apertures for mounting and actuation of the pivot cam 60. In 20*a* there is depicted aperture 70 and in 21*a* there is depicted aperture 71. In arm 41*a* there is formed a through aperture 73 and in arm 42*a* there is formed aperture 74. These apertures are of like size. The several other hols in the arm members are of other like diameters. It is contemplated that The C-shaped arm members will be made with a single die, and with another die offsets are formed so that the arms 20 and 21 will be offset to form an inner spacing and the arms 41 and 42 will be offset to form an outer spacing in which the arm ends overlay one another as seen in FIG. 5.

It is to be noted that rivet 27 is shorter than rivets 28 and 29 as this rivet is used to retain the inwardly-directed offset portions 20*a* and 21*a* of the C-shaped arm members. In like manner, rivet 48 is different from the other rivets in that it has the body portion lengthened to accommodate the outward offsets 41*a* and 42*a* of the other C-shaped arm members. The several rivet holes may be of like or different diameters and are merely a matter of selection. As viewed in FIG. 1, holes 25 and 47, which retain the ends of rivets 24 and 50, are slightly smaller than the diameter of holes 23, 24, 45 and 46, but this is merely a matter of selection. All trunnion block holes for the pin portions provided thereon are like size. The stop pin 68 for limiting the cam rotation is a dowel or commercial pin member such as a roll pin. Rivets 28, 29, 49 and 50 are contemplated to be alike in length as arm portions 20*b*, 21*b*, 41*b* and 42*b* in the assembled condition are in parallel array and move in like and the same planes.

EMBODIMENT AS SHOWN IN FIG. 2

Figure 2:
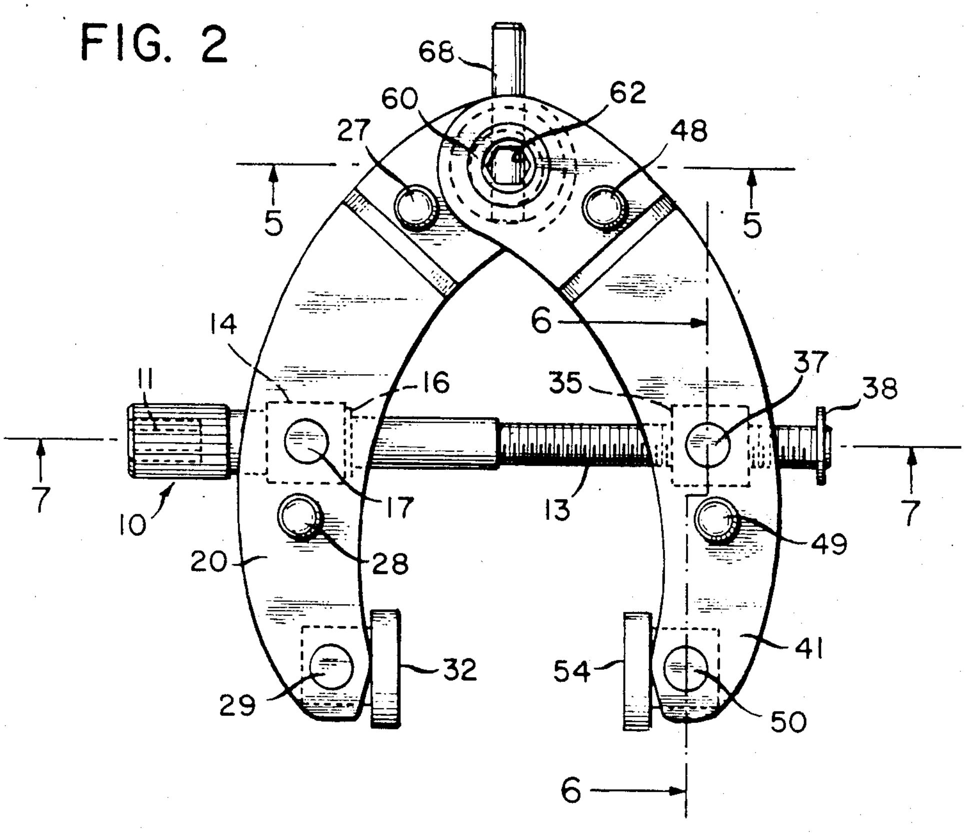
FIG. 2 represents a top or plan view of the clamping device of FIG. 1 with the several components in an assembled condition and with the jaws in a substantially opened condition.

In FIG. 2, the screw head is shown to the left and the clamp is depicted in a partially open condition, about two-thirds of capacity. As can be seen, the threaded portion 13 of screw 10 still has some way to go. As depicted, the stop pin 68 is midway of stop limits as provided by secured rivets 27 and 48. A discussion of the pivot cam 60 will be made hereinafter.

EMBODIMENT AS SHOWN IN FIG. 3

Figure 3:
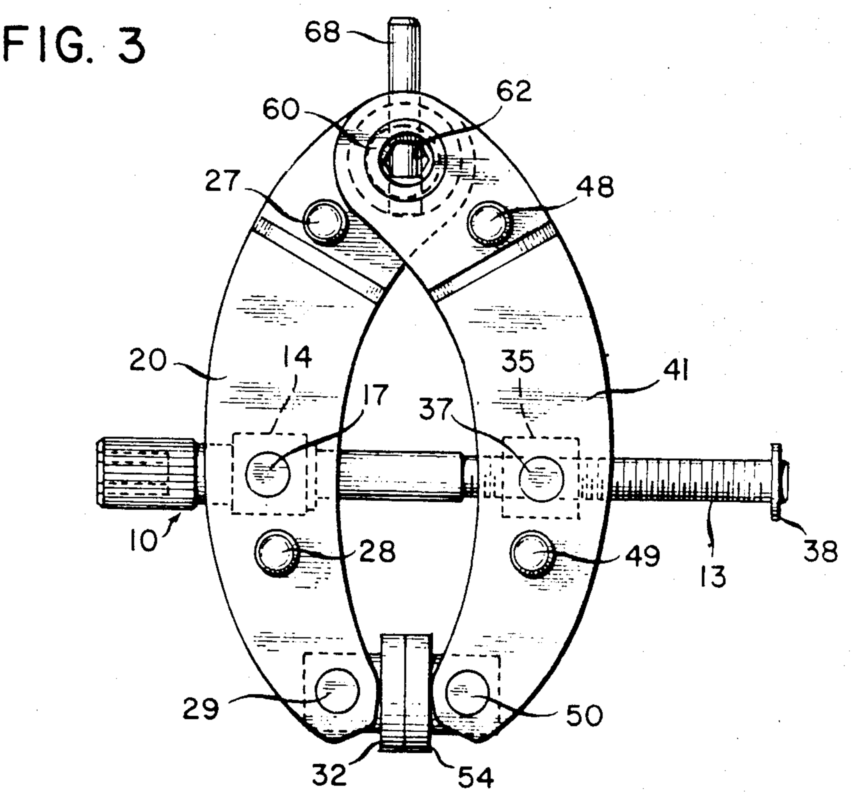
FIG. 3 represents the clamping device of FIG. 2 with the jaw ends brought together.

In FIG. 3, the clamping device of FIG. 2 is repeated, but with the clamp pads 32 and 54 in substantially a closed condition and with the stop pin 68 still in the condition of FIG. 2.

EMBODIMENT AS SHOWN IN FIG. 4

In this showing, which is very fragmentary and in an enlarged scale, the pivot cam 60 is shown in a plan view clearly depicting a hex passageway 62. Other configurations may be used as this through passageway is merely a matter of selection and convenience as most machine shops have hex wrenches (Allen-type). A hex wrench is also used with the screw 10. An aperture is formed in this pivot cam in which is tightly mounted stop pin 68. The eccentric cam portion 66 is particularly formed in relation to this stop pin 68. This relationship is more fully discussed later in conjunction with FIGS. 8A, B, C and D. It is to be noted that stop pin 68 provides a seat for insertion of a hex wrench into the pivot cam 60 for final tightening from either side.

EMBODIMENT AS SHOWN IN FIG. 5

The clamping device, when assembled, utilizes the pivot pin 60 and the cam portions **66*a* and 66*b* to provide the desired application of clamping force. The upper offset portions 41*a* and 42*a* are shown disposed as outer arm portions. These arm portions and the apertures 73 and 74 therein rotatably engage the reduced diameter 64 as formed on the pivot cam. Immediately inside offsets 41*a* and 42*a* and parallel to and slideable thereby are inner offset portions 20*a* and 21*a*. These ends also have apertures 70 and 71 which are the same size as the apertures 73 and 74 in the other two outer members. These apetures 70 and 71 are slideable past diameter 64 and rest on the enlarged diameter 63 of the pivot pin. These apertures 70 and 71 engage and move in the eccentric grooves 66*a* and 66*b* formed in this pivot pin 60. The stop pin 68 is shown substantially midway of the hex passageway 62** formed in said pivot pin.

EMBODIMENT AS SHOWN IN FIG. 6

Figure 6:
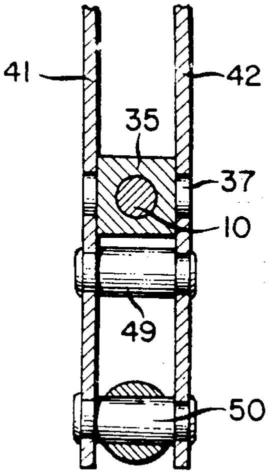
FIG. 6 represents a fragmentary side and sectional view, partly diagrammatic, and showing the preferred arrangement of members, with this view taken on the line 6—6 of FIG. 2 and looking in the direction of the arrows.

In. FIG. 6, a fragmentary sectional view is provided to illustrate the relationship of the threaded trunnion 35 with the pivot pin portions 37 in holes 52 in plates 41 and 42. Rivet 50 is depicted pivotally retaining clamp pad 54. Rivet 49 is also shown securing and providing the spacing of and for arm plates 41 and 42.

EMBODIMENT AS SHOWN IN FIG. 7

Figure 7:
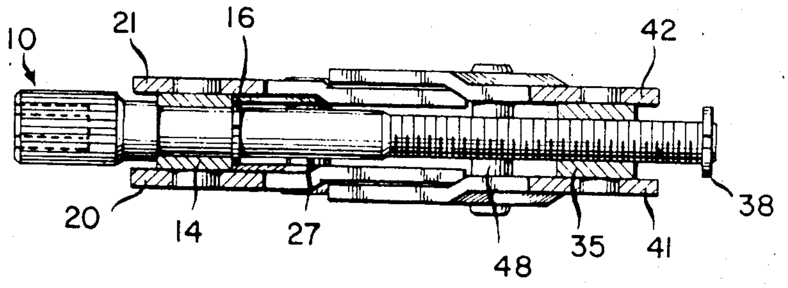
FIG. 7 represents a side sectional view, partly diagrammatic, and showing the midlength adjusting screw, this view taken on the line 7—7 of FIG. 2 and looking in the direction of the arrows.

In FIG. 7, a sectional view taken on the line 7—7 of FIG. 2 is depicted to illustrate that the clamping device in an assembled condition is adapted to lay flat and be used with the adjusting screw head either to the left or to the right. Shown in this view are retaining rings 16 and 38 mounted on screw 10. The arm members 20 and 21 are shown as substantially in the same plane as arm members 41 and 42. The trunnion block 14 and the threaded trunnion block 35 are also shown. The rivets 27 and 48 are also seen and provide limit stops for the manipulation of the stop or limit pin 68 seen in FIGS. 4 and 5 above.

PIVOT CAM ACTUATION AS IN FIGS. 8A, 8B, 8C AND 8D

Referring next, and finally, to the drawings and FIGS. 8A, 8B, 8C and 8D, these FIGS. are merely a diagrammatic showing of the pivot cam of a clamp of about three-inch maximum opening. In these drawings-diagrams, the dimensions are for a three-inch maximum clamp, which diagrams are illustrative of said clamp. In these FIGS., the precise relationship of the pivot cam to the stop pin 68, the C-shaped arms and the rivet stops is noted. It is to be noted that rivets 27 and 48 establish the limits of rotative movement of stop pin 68.

Figure 8A:
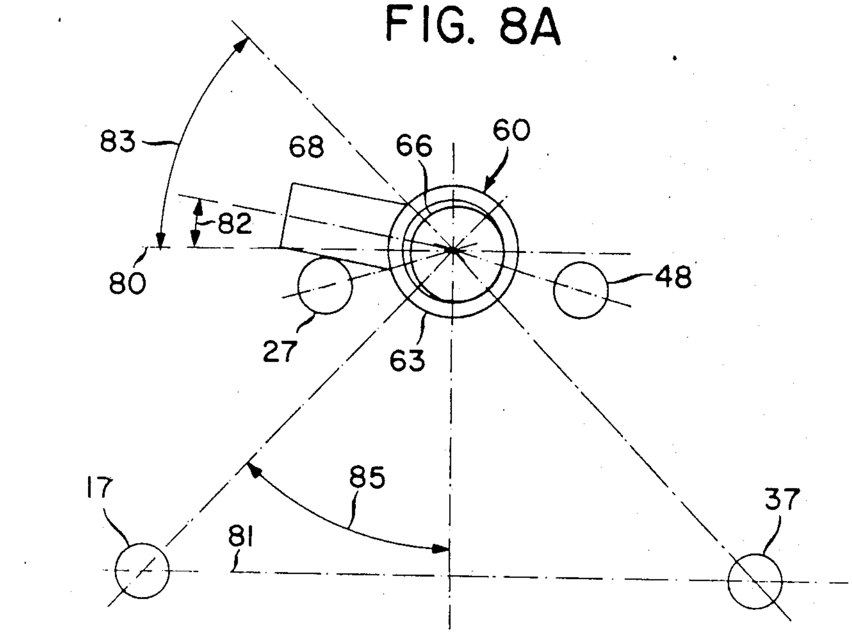
FIG. 8A represents a diagrammatic view of the limit or stop pin as moved to a "cam free" condition, with the pressure pads adjusted to the outer limit and with the screw head to the left.

In FIG. 8A is shown the relationship of the cam portion 66 to the stop pin 68 and assuming the head of screw 10 is on the left. In this FIG., the C-shaped arms have been moved to substantially the maximum opening, with the trunnion pivots 17 and 37 about four inches apart. As seen, stop pin 68 is swung to the left to the limit established by rivet 27. For comparison of sizes, the body of the rivet is three-eights of an inch in diameter and is seven-eighths of an inch on centers from the center of pivot pin 60. The diameter of the stop pin 68 is contemplated to be three-eights of an inch in diameter and, in the angles and dimensions as noted, the size or diameter of this stop pin is very important as to the actuating relationship. Assuming a theoretical line 80 parallel to line 81, which is the theoretical line between trunnion pins 17 and 37, stop pin 68 is about ten and one-quarter degrees, identified as included angle 82. The lowest point of cam 66 is at an angle 83 of about forty-four degrees, which is about the same as angle 85 from a theoretical center line to a trunnion pivot. These assumed dimensions contemplate that the screw center line at this showing is slightly more than two and one-sixteenth inches from the screw center line 81 to the center of the pivot cam 60.

Figure 8B:
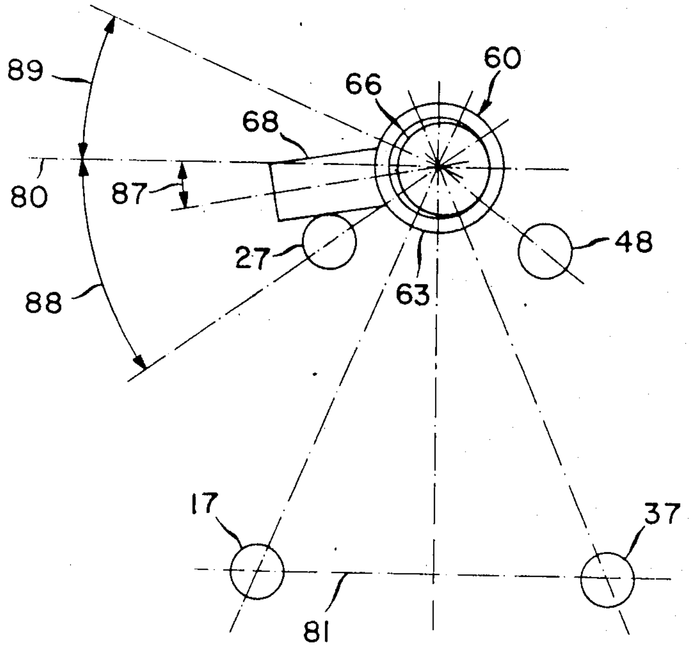
FIG. 8B represents the view of FIG. 8A, but with the pressure pads adjustably moved to inner limits.

In FIG. 8B, the adjusting screw 10 has brought the clamp jaw ends 32 and 54 into a together condition as depicted in FIG. 3, but with the stop pin 68 moved into the leftward limiting position against rivet 27. The stop pin 68, rather than above the theoretical horizontal line 80, is now below (toward the screw) and with about the same amount of swing, identified as 87. It is to be noted that trunnion pins 17 and 37 have moved toward each other to about two and three-tenths inches therebetween. The rivets 27 and 48 have been correspondingly moved so that, whereas the angle in FIG. 8A was about fifteen and one-half degrees, this angle is about thirty-six degrees. This angle is identified as 88. The lowest point of the cam, rather than the angle 83 of FIG. 8A, is now about twenty-three and one-half degrees and is identified as 89. The cam's low point is always perpendicular to a line drawn from the center of the cam 60 to the center of the trunnion 17. With the moving of the trunnions closer together, the distance from the center line of the screw to the center of the pivot pin is increased and is about two and five-eights inches.

Figure 8C:
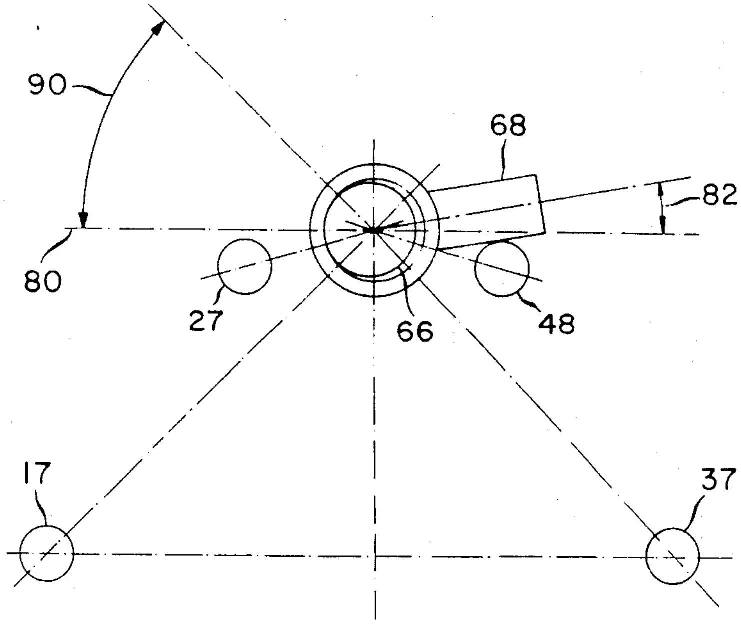
FIG. 8C represents the view of FIG. 8A, but with the stop pin moved to bring the cam into a "tight" condition.

In FIG. 8C, the arrangement of the trunnion spacing of FIG. 8A is repeated, but with the stop pin 68 swung so that it now is against rivet 48. The cam portion 66 has been moved so that the high point of the cam bearing is about forty-four degrees (identified as 90) above the horizontal line and left of the vertical center line. The direction of force swinging the jaw 32 into the workpiece is supplied by this high portion of the cam.

Figure 8D:
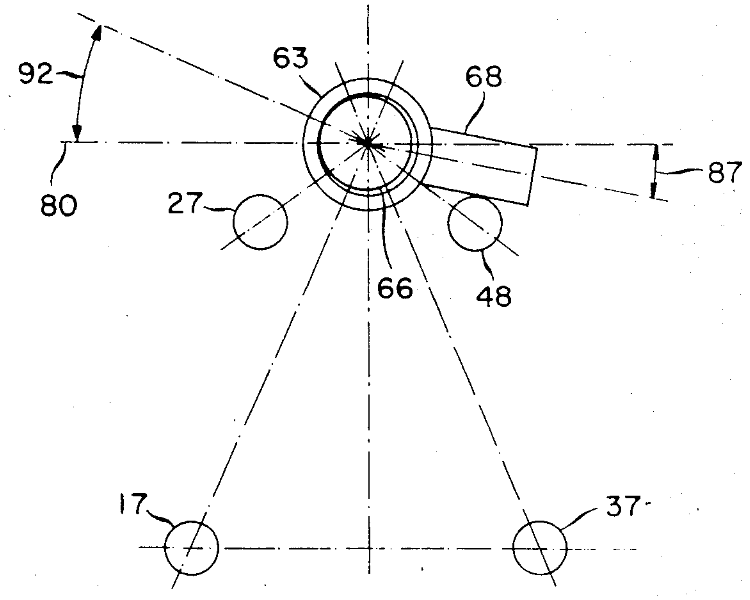
FIG. 8D represents the condition of FIG. 8B, but with the pressure pads adjustably moved into an inner condition and the pin moved to bring the cam into a "tight" condition.

In FIG. 8D, the arrangement of the trunnion spacing of FIG. 8B is repeated, but the stop pin is shown as swung to the right against rivet 48. The cam portion 66 now brings the hight point of the cam in position to move the jaw 32 into the workpiece gripping condition. The direction of force, identified as 92, is about twenty-three and one-half degrees.

It is to be noted that the cam 66 formed in pivot pin 60 has about a sixty-degree full-diameter dwell area. The purpose of this feature is to compensate for the differing angles of FIG. 8C, 90 and FIG. 8D, 92, and infinitely therebetween. Thus, when the clamping device is fully open and cam 66 is in the full "tight" position, FIG. 8C, the full diameter of cam 66 is entered upon about nine and one-half degrees. When the clamping device is fully closed and cam 66 is in the full "tight" position, FIG. 8D, the sixty-degree full-diameter dwell area is within about nine and one-half degrees of being overridden. The purpose of this dwell area is to prevent such override but, in practice, it is only necessary to rotate the cam sufficiently to enter upon the dwell area to achieve full force.

It is also to be noted that the pivot pin 60 has the hex passageway 62 completely therethrough. This permits tightening of the clamping device from either side, as necessary or convenient. It is also perceived to be desirable in the manufacturing process, affording a means of orienting the pivot pin 60 for forming the transverse hole for stop pin 68 and forming the cam surfaces 66 in proper relationship to one another.

All measurements and degrees are noted for a clamping device of about three-inch maximum opening, but variations may be made to suit the designer and producer, and such suggested dimensions are not limiting.

It is realized that although illustrated as forming the arm assemblies of like blanking and stamping dies, one arm assembly may be made without offset end portions. Such an arrangement would result in altering the positioning of the apertures for the pivot pin. The illustrated offset allows the C-shaped arm members to be blanked and punched from the same die and then to be offset the same amount, which is one-half the thickness of the metal sheet used for these arm members. The rivets are usually of plated steel and the reduced ends are made of sufficient extended length for rivet forming of the retained ends. The pressure pads are pivotally retained by rivets. In an assembled condition, the lower portions of each arm member lie in parallel or the same planes.

As shown in FIGS. 8A, 8B, 8C and 8D, the eccentric cam portions 66 are formed to provide dwell portion 91 which, as noted above, is about sixty degrees. This dwell, identified as 91, is formed as a result of not forming the eccentric cam areas as circular, but only about three hundred degrees of arc. This dwell as described above provides the ability of utilizing this clamp for workpieces of various thicknesses from the very thin to substantially maximum opening, with the adjustment allowing movement of the stop arm 68 from open to a closed condition.

This clamping device as made and assembled is believed to provide a novel method of construction and assembly, which includes the steps of:

forming and assembling a pair of C-shaped arms;

pivotally retaining a pair of C-shaped arm assemblies at one end and at the other end of each arm assembly retaining a pressure clamp pad, with each arm assembly of two substantially alike plate-like members of metal, and arranging and maintaining said members in spaced array by spacers and securing means, and at the pivotally-retained end disposing these arms in overlaid condition, and in each plate forming a pivot aperture, with the formed aperture disposed for axial alignment;

positioning and retaining a pivot cam at one end of the overlapped arm members and forming on this pivot cam two eccentric cam surfaces sized to be engaged with each of the apertured surfaces of the two plate-like member of only one of the pair of arms and forming the intermediate portion of the pivot cam with an enlarged portion sized to be slideably retained between the smallest distance between plate-like arm members when in overlaid condition;

forming a pair of trunnion blocks with pivot portions and mounting one trunnion block so as to be pivotally carried between said plate-like members in each arm, and positioning each trunnion block intermediate the extent of the C-shaped arm assemblies, with each block disposed to be a precisely equal distance from the axis of the mounted pivot cam, one trunnion block having threads formed therein and the other trunnion block having a smooth bore therethrough;

mounting in the trunnion blocks a threaded cap screw having a head member adapted for rotative manipulation and having a shank portion with a threaded end portion, with these threads compatible with those threads in the threaded trunnion block, and providing limiting means for longitudinal retention of the cap screw in that trunnion block having a smooth bore and inserting the threads on the cap screw in the threads formed in the threaded trunnion block, said cap screw providing an adjusting means and a force member that brings the pressure clamp pads toward and away from each other;

mounting a first rivet near the pivot cam, said rivet having an enlarged midportion of a determined size and length so as to establish and maintain the plate-like members of a first arm in spaced array, and securing this first rivet at a precise location and distance from the axis of the pivot cam;

mounting a second rivet near the pivot cam, this second rivet also having an enlarged midportion of a size like that provided by the first rivet, this second rivet having a length so as to establish and maintain the plate-like members of this other clamp arm in spaced array, and securing this second rivet at a precise location and distance from the axis of the pivot cam, the first and second rivets so positioned that their axes establish a theoretical line therebetween so as to be always parallel to a theoretical line through the pivot axes of the trunnion blocks, said first and second rivets and their precise location at a like distance from the axis of the pivot cam;

mounting another pair of rivets, each having enlarged midportions, one rivet positioned in said first arm assembly adjacent a trunnion block, and another similar rivet positioned in the other arm assembly and also adjacent the trunnion block in said other arm assembly, and forming a hole and fixedly inserting in said hole a stop pin in the enlarged portion of the pivot cam, this stop pin of sufficient length so that said stop pin as it is swung in an arc is limited by said first or second rivet, this stop pin being secured so that when the stop pin engages one of the first or second rivets, the cam surfaces formed on the pivot cam engage the apertures in that arm assembly disposed to be actuated by the eccentric cam, the maximum throw of the arm assembly moving the pressure clamp pads closer together and, when the stop pin is moved to the other limit, the clamp pads are moved away from each other.

Terms such as "left," "right," "up," "down," "bottom," "top," "front," "back," "in," "out," and the like are applicable to the embodiment shown and described in conjunction with the drawings. These terms are merely for the purposes of description and do not necessarily apply to the position in which the clamping device may be constructed or used.

While a particular embodiment of the clamping device and the method of construction have been shown and described, it is to be understood that the invention is not limited thereto and protection is sought to the broadest extent the prior art allows.

What is claimed is:

1. A method of forming and assembling a clamping device for gripping a workpiece or workpieces between clamp pads disposed at the distal ends of a pair of pivotally-retained arms, these steps including:

(a) pivotally retaining a pair of C-shaped arm assemblies at one end and at the other end of each arm assembly retaining a pressure clamp pad, with each arm assembly of two substantially alike plate-like members of metal, and arranging and maintaining said members in spaced array by spacer and securing means, and at the pivotally-retained end disposing these arms in overlaid condition, and in each plate forming a pivot aperture, with the formed apertures disposed for axial alignment;

(b) positioning and retaining a pivot cam at one end of the overlapped arm members and forming on this pivot cam two eccentric cam surfaces sized to be engaged with each of the apertured surfaces of the two plate-like members of only one of the pair of arms and forming the intermediate portion of the pivot cam with an enlarged portion sized to be slideably retained between the smallest distance between plate-like arm members when in overlaid condition;

(c) forming a pair of trunnion blocks with pivot portions and mounting one trunnion block so as to be pivotally carried between said plate-like members in each arm, and positioning each trunnion block intermediate the extent of the C-shaped arm assemblies, with each block disposed to be a precisely equal distance from the axis of the mounted pivot cam, on trunnion block having threads formed therein and the other trunnion block having a smooth bore therethrough;

(d) mounting in the trunnion blocks a threaded cap screw having a head member adapted for rotative manipulation and having a shank portion with a threaded end portion, with these threads compatible with those threads in the threaded trunnion block, and providing limiting means for longitudinal retention of the cap screw in that trunnion block having a smooth bore and inserting the threads on the cap screw in the threads formed in the threaded trunnion block, said cap screw providing an adjusting means and a force member that brings the pressure clamp pads toward and away from each other;

(e) mounting a first rivet near the pivot cam, said rivet having an enlarged midportion of a determined size and length so as to establish and maintain the plate-like members of a first arm in spaced array, and securing this first rivet at a precise location and distance from the axis of the pivot cam;

(f) mounting a second rivet near the pivot cam, this second rivet also having an enlarged midportion of a size like that provided by the first rivet, this second rivet having a length so as to establish and maintain the plate-like members of this other clamp arm in spaced array, and securing this second rivet at a precise location and distance from the axis of the pivot cam, the first and second rivets so positioned that their axes establish a theoretical line therebetween so as to be always parallel to a theoretical line through the pivot axes of the trunnion blocks, said first and second rivets and their precise location at a like distance from the axis of the pivot cam;

(g) mounting another pair of rivets, each having enlarged midportions, one rivet positioned in said first arm assembly adjacent a trunnion block, and another similar rivet positioned in the other arm assembly and also adjacent the trunnion block in said other arm assembly, and (h) forming a hole and fixedly inserting in said hole a stop pin in the enlarged portion of the pivot cam, this stop pin of sufficient length so that said stop pin as it is swung in an arc is limited by said first or second rivet, this stop pin being secured so that when the stop pin engages one of the first or second rivets, the cam surfaces formed on the pivot cam engage the apertures in that arm assembly disposed to be actuated by the eccentric cam, the maximum throw of the arm assembly moving the pressure clamp pads closer together and, when the stop pin is moved to the other limit, the clamp pads are moved away from each other.

2. A method of forming and assembling a clamping device as in claim 1 which includes the further step of forming each platelike member with a substantially identical configuration and apertures and with an upper end providing at the overlaid end an offset, which offset extent is about one-half the thickness of the material used in the making of each plate-like member, and also forming the pivot cam with a through hexagonal aperture and forming the smaller diameter end portions of the pivot cam so as to be rotatable in like diameter apertures in the upper extent of each plate-like member.

3. A method of forming and assembling a clamping device as in claim 2 which further includes the step of providing on the trunnion blocks integral pivot pin portions and adjacent these pivot pin portions positioning a rivet between said trunnion block and a pivoted clamp pad.

4. A method of forming and assembling a clamping device as in claim 3 which further includes forming each of the clamp pads of hardened steel with rounded workpiece-gripping pad portions and reduced diameter shank portions sized to be retained between the fixed plate-like members, and forming the reduced diameter portions with a transverse hole sized to rotatably retain the central portion of a rivet whose ends are mounted in and pass through holes formed in the end portions of the plate-like arm member portions.

5. A method of forming and assembling a clamping device as in claim 4 in which the limiting means for longitudinal retention of the threaded cap screw further includes providing a screw having a head that is less in diameter than the inner distance of the plate-like members that form the C-shaped arm assemblies, and forming said head with a shoulder terminating with a shank portion sized to be rotatably retained in the smooth bore formed in the trunnion block, the shoulder providing a limiting longitudinal movement control against the outside face of said trunnion, and removably mounting a retainer in a groove formed in the shank of the cap screw, this retainer, when mounted in the groove in the shank, engaging the inner face of the trunnion block.

6. A method of forming and assembling a clamping device as in claim 5 which also includes forming a groove in the threaded cap screw near the outer end of the threaded portion and mounting in this groove a retainer, this retainer providing an outer stop to movement of the threaded trunnion block outwardly along the thread portion of the cap screw.

7. A method of forming and assembling a clamping device as inclaim 6 which also includes the step of forming the two eccentric cam surfaces on the pivot cam adjacent the intermediate enlarged portion, and with said cam surfaces of a width substantially the thicknesses of the metal providing the platelike members, and adjacent these eccentric cam portions the pivot cam has outer diameters rotatable in apertures formed in said plate-like members.

* * * * *